United States Patent
Jung

(10) Patent No.: US 10,651,671 B2
(45) Date of Patent: May 12, 2020

(54) WIRELESS POWER CHARGING SYSTEM

(71) Applicant: INTEL CORPORATION, Santa Clara, CA (US)

(72) Inventor: Chun-Kil Jung, Seoul (KR)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 15/595,410

(22) Filed: May 15, 2017

(65) Prior Publication Data

US 2017/0250576 A1    Aug. 31, 2017

Related U.S. Application Data

(63) Continuation of application No. 15/046,335, filed on Feb. 17, 2016, now Pat. No. 9,685,817, which is a
(Continued)

(30) Foreign Application Priority Data

Nov. 30, 2007    (KR) .......................... 10-2007-0123750

(51) Int. Cl.
*H02J 7/00*    (2006.01)
*H02J 7/02*    (2016.01)
(Continued)

(52) U.S. Cl.
CPC .............. *H02J 7/025* (2013.01); *H02J 5/005* (2013.01); *H02J 7/0077* (2013.01); *H02J 7/04* (2013.01);
(Continued)

(58) Field of Classification Search
USPC ........................................................ 320/108
See application file for complete search history.

(56) References Cited

U.S. PATENT DOCUMENTS

| 5,157,319 | A | 10/1992 | Klontz et al. |
| 5,596,261 | A | 1/1997 | Suyama |

(Continued)

FOREIGN PATENT DOCUMENTS

| JP | 2006141170 | 6/2006 |
| JP | 2006517378 | 7/2006 |

(Continued)

OTHER PUBLICATIONS

European Search Report, EP Application No. 17199670, dated Mar. 9, 2018, 2 pages.

(Continued)

*Primary Examiner* — Samuel Berhanu
(74) *Attorney, Agent, or Firm* — International IP Law Group, P.L.L.C.

(57) ABSTRACT

A wireless power charging system has a wireless power transmission apparatus formed to charge a plurality of wireless power receiving apparatuses located in a short distance therefrom, wherein the total charging time for the wireless power receiving apparatuses is saved. The wireless power transmission apparatus has a main control unit and a resonant converter unit, which transmit the electric signal to the wireless power receiving apparatus via the resonance signal generated from a primary charge core in order to change the wireless power receiving apparatuses. The wireless power transmission apparatus also includes an output signal conversion module for transmitting a converted electric signal to the resonant converter unit and a received signal process module for processing a signal transmitted form the wireless power receiving apparatus.

45 Claims, 4 Drawing Sheets

Related U.S. Application Data continuation of application No. 12/147,071, filed on Jun. 26, 2008, now abandoned.

(51) Int. Cl.
| | | |
|---|---|---|
| *H02J 50/80* | (2016.01) | |
| *H02J 50/12* | (2016.01) | |
| *H02J 7/04* | (2006.01) | |
| *H02J 5/00* | (2016.01) | |
| *H04B 5/00* | (2006.01) | |

(52) U.S. Cl.
CPC .............. *H02J 50/12* (2016.02); *H02J 50/80* (2016.02); *H04B 5/0037* (2013.01); *H02J 7/0047* (2013.01); *H02J 2007/0001* (2013.01); *H02J 2007/005* (2013.01); *H02J 2007/0096* (2013.01); *Y02B 40/90* (2013.01)

(56) References Cited

U.S. PATENT DOCUMENTS

| | | | |
|---|---|---|---|
| 5,898,234 A | 4/1999 | Kitagawa | |
| 6,039,251 A * | 3/2000 | Holowko | A61M 5/172 |
| | | | 235/380 |
| 6,184,651 B1 | 2/2001 | Fernandez | |
| 6,522,100 B2 | 2/2003 | Hansford | |
| 6,992,462 B1 | 1/2006 | Hussaini | |
| 8,836,279 B2 * | 9/2014 | Nakano | H02J 50/80 |
| | | | 320/108 |
| 9,035,601 B2 * | 5/2015 | Kim | H02J 17/00 |
| | | | 320/108 |
| 2004/0145342 A1 | 7/2004 | Lyon | |
| 2004/0267501 A1 | 12/2004 | Freed et al. | |
| 2005/0068019 A1 | 3/2005 | Nakamura et al. | |
| 2005/0127867 A1 * | 6/2005 | Calhoon | G06F 1/26 |
| | | | 320/108 |
| 2005/0189910 A1 | 9/2005 | Hui | |
| 2006/0022041 A1 | 2/2006 | Nakane et al. | |
| 2007/0024235 A1 | 2/2007 | Guthrie | |
| 2007/0182367 A1 | 8/2007 | Partovi | |
| 2008/0169706 A1 | 7/2008 | Onishi | |
| 2009/0096413 A1 | 4/2009 | Partovi et al. | |
| 2014/0312848 A1 * | 10/2014 | Alexander | H02J 7/0013 |
| | | | 320/134 |
| 2015/0329005 A1 * | 11/2015 | Oishi | G01C 21/32 |
| | | | 701/22 |

FOREIGN PATENT DOCUMENTS

| | | |
|---|---|---|
| JP | 2007089341 A | 4/2007 |
| JP | 2007190288 | 8/2007 |
| KR | 100554554889 B1 | 3/2006 |
| KR | 100649592 | 11/2006 |
| KR | 20070014804 A | 2/2007 |
| WO | 2005109597 A1 | 11/2005 |
| WO | 2006001557 A1 | 1/2006 |
| WO | 2007008646 | 1/2007 |
| WO | 2009014125 A1 | 1/2009 |

OTHER PUBLICATIONS

European Search Report, EP Application No. 17196396, dated Feb. 8, 2018, 2 pages.

European Search Report, EP Application No. 08159326, dated of completion Sep. 27, 2012, 2 pages.

Kurs, A. et al.; "Wireless Power Transfer via Strongly Coupled Magnetic Resonances", Science 317, 83, 2007, 5 pages, American Association for the Advancement of Science, Washington, DC.

* cited by examiner

WIRELESS POWER CHARGING SYSTEM

CLAIM OF PRIORITY

This application is a continuation of U.S. patent application Ser. No. 15/046,335 filed Feb. 17, 2016, which is a continuation of U.S. patent application Ser. No. 12/147,071 filed Jun. 26, 2008 which claims the benefit of Korean Patent Application No. 10-2007-0123750 filed on Nov. 30, 2007, in the Korean Intellectual Property Office, the disclosure of which is incorporated herein by reference.

BACKGROUND OF THE INVENTION

Field of the Invention

The present invention relates to a wireless power charging system, and more particularly, to a short-distance wireless power charging system, which has a wireless power transmission apparatus formed to charge a plurality of wireless power receiving apparatuses located in a short distance there from, wherein the total charging time for a plurality of wireless power receiving apparatuses can be saved.

Description of the Related Art

Portable electronic devices, such as cellular phones, personal digital assistants (PDAs), portable media players (PMPs), digital multimedia broadcasting terminal (DMB terminals), MPEG audio layer 3 (MP3) players or notebook computers, cannot be plugged into the regular power at home or office since they are generally used while the users are moving. Accordingly, the portable electronic devices are equipped with batteries or rechargeable batteries.

A charging system has been used to charge electric power, supplied from a regular power source, to the batteries or a battery pack of the portable devices via power supply lines or power supply connectors. However, when the charger and the batteries are connected or disconnected to replenish the electric power of the batteries with this connector supply system, an instant discharge may happen because of the potential differences between the charger connector and the battery connector. Hence the foreign substances will be gradually gathered on both connectors and finally there may be a fire disaster. Further, the collected humidity thereon will cause the discharge of the battery and other problems will be involved like the declining battery life, the low battery quality, and so on.

To solve the above-mentioned problems of the charging system using the power supply connectors, non-contacting charging systems have been developed. In this non-contacting charging system in accordance with the prior art, the device having the battery to be charged is placed over the primary coil of the non-contacting charging system and the battery will be charged by the secondary coil of the battery. The battery is charged with the induced electricity from the induced electromotive force of the secondary coil by the generated magnetic field from the primary coil.

The conventional non-contacting charging systems with can only be used to supply the electricity to the portable devices. There are limited practical uses because they cannot be used in various alternatives.

Besides, if a metal is placed inside the effective radius of the generated magnetic field of the primary coil, there would be a lot loss of the electricity in the primary coil and non-contacting charging system may be damaged.

SUMMARY OF THE INVENTION

To solve the above-mentioned problems, the present invention is directed to a wireless power charging system formed to charge a plurality of wireless power receiving apparatuses placed in a short distance from a wireless power transmission apparatus, wherein the total charging time for a plurality of wireless power receiving apparatuses will be saved.

Moreover, when a plurality of wireless power receiving apparatuses are fully charged, the wireless power transmission system will be automatically changed to a standby mode, wherein the initial pulse signal is sending out. By doing so, the charging efficiency will be maximized while the loss of the electricity will be minimized.

According to an aspect of the present invention, there is provided a wireless power charging system for charging one or a plurality of wireless power receiving apparatuses in a short distance from a wireless power transmission apparatus. The wireless power transmission apparatus includes a power transmission apparatus case as an outside body housing a main control unit and a resonant converter unit, which transmit an electric signal to one or via a resonance signal generated from a primary charge core; an output signal conversion module for transmitting the converted electric signal to the resonant converter unit by the control signal from the main control unit; and a received signal process module, which processes a signal transmitted from the wireless power receiving apparatus via the primary charge core and sends the processed signal out to the main control unit.

Hereupon the resonant converter unit may include an R-L-C series-parallel resonant converter.

The power transmission apparatus case may include a power on/off switch on the front side thereof; an input panel for signal input; and a display panel showing the charging status of the wireless power receiving apparatus and normal/abnormal status of the wireless power transmission apparatus. The power transmission apparatus further includes a power supply unit installed inside the power transmission apparatus case.

The main control unit may include a power supply block connected with the power supply unit for the power supply to the wireless power transmission apparatus; a signal output block for sending the display signal to show the status on a display panel; a gate output signal process block coupled with an output signal conversion module for transmitting a power signal transferred from the primary charge core; a received signal process block for processing a signal transmitted from a received signal process module, which processes the signal transmitted from the wireless power receiving apparatus; and a main controller which controls the power supply block, the signal output block, the gate output signal process block, and the received signal process block.

Furthermore, the wireless power receiving apparatus may include a secondary charge core fronting the primary charge core of the wireless power transmission apparatus in order to receive the power signal via the resonant with the magnetic field; a received power signal conversion module connected with the secondary charge core for converting the received power signal; a charge circuit block linked with the received power signal conversion module in order to charge the battery cell; a protection circuit block formed between the charge circuit block and the battery cell for detecting the charged current into the battery cell and sending the charging status of the battery cell to the wireless device control module; a voltage regulator block for the power supply to the wireless device control module; and a wireless device control module, which controls the received power signal conversion module, the charge circuit block, the protection circuit block, and the voltage regulator block.

The present invention formed with the above-mentioned figures is constructed to charge a plurality of wireless power receiving apparatuses located in a short distance from the wireless power transmission apparatus, wherein the advantageous effect is that the total charging time for a plurality of wireless power receiving apparatuses can be saved.

Moreover, when a plurality of wireless power receiving apparatuses are fully charged, the wireless power transmission system will be changed to a stand-y mode where the initial pulse signal is sending out. By doing so, the charging efficiency will be maximized while the loss of electric power will be minimized.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The invention will now be described in detail with reference to the accompanying drawings.

Figure 1:
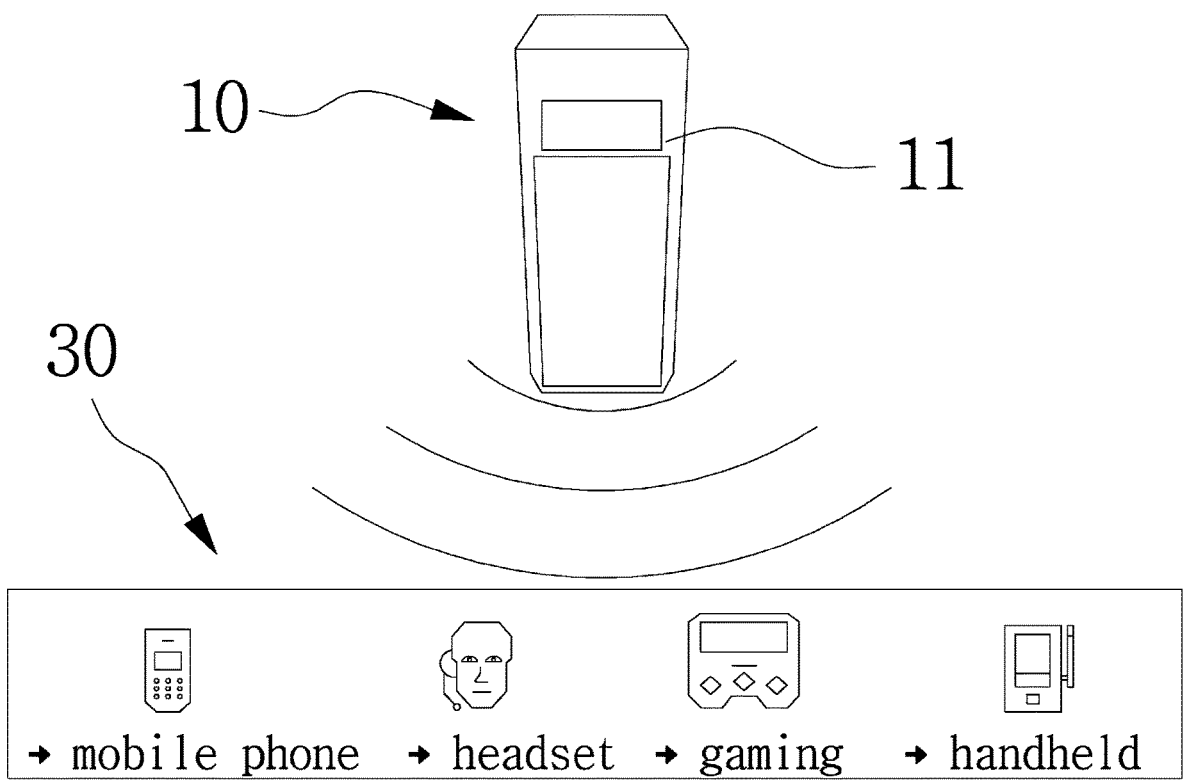
FIG. 1 is a schematic configuration view of a wireless power charging system in accordance with the present invention.
Figure 2:
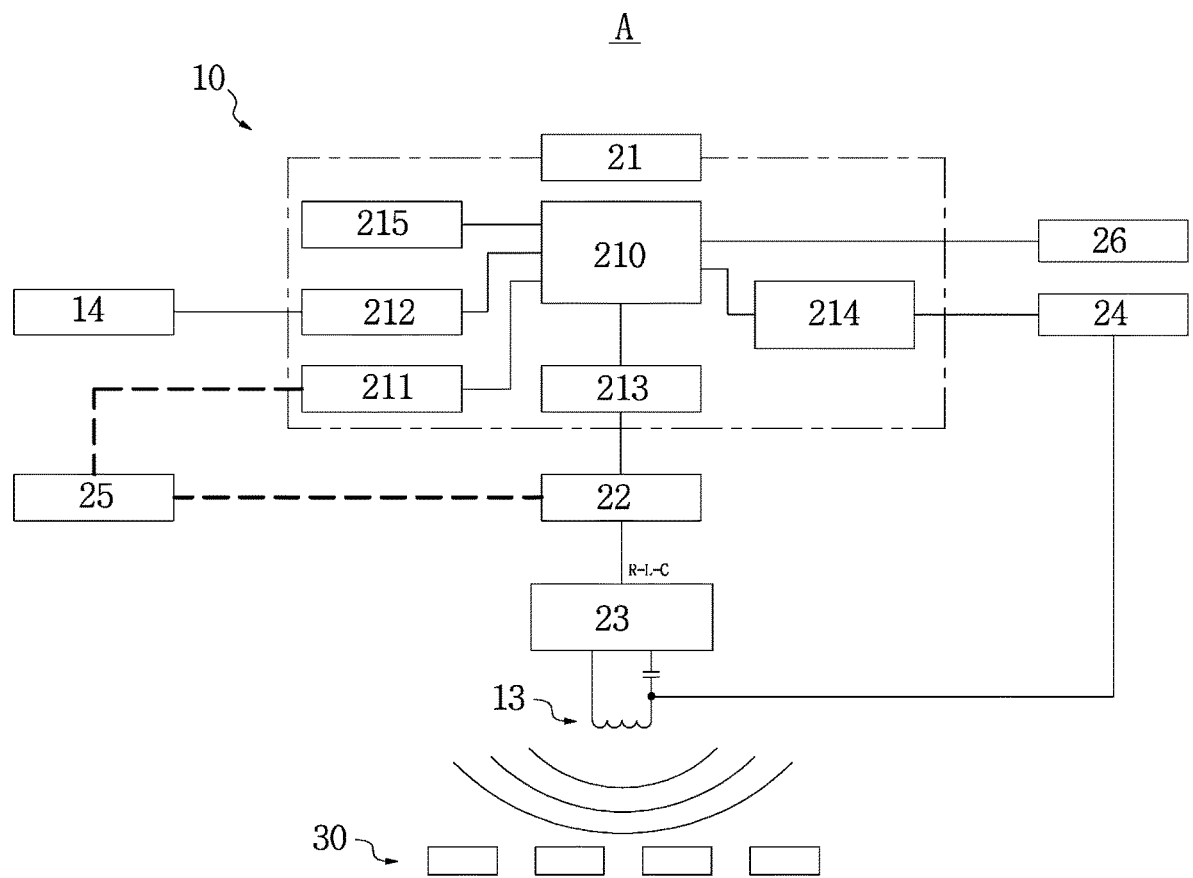
FIG. 2 is a block diagram of a wireless power transmission apparatus in accordance with the present invention.
Figure 3:
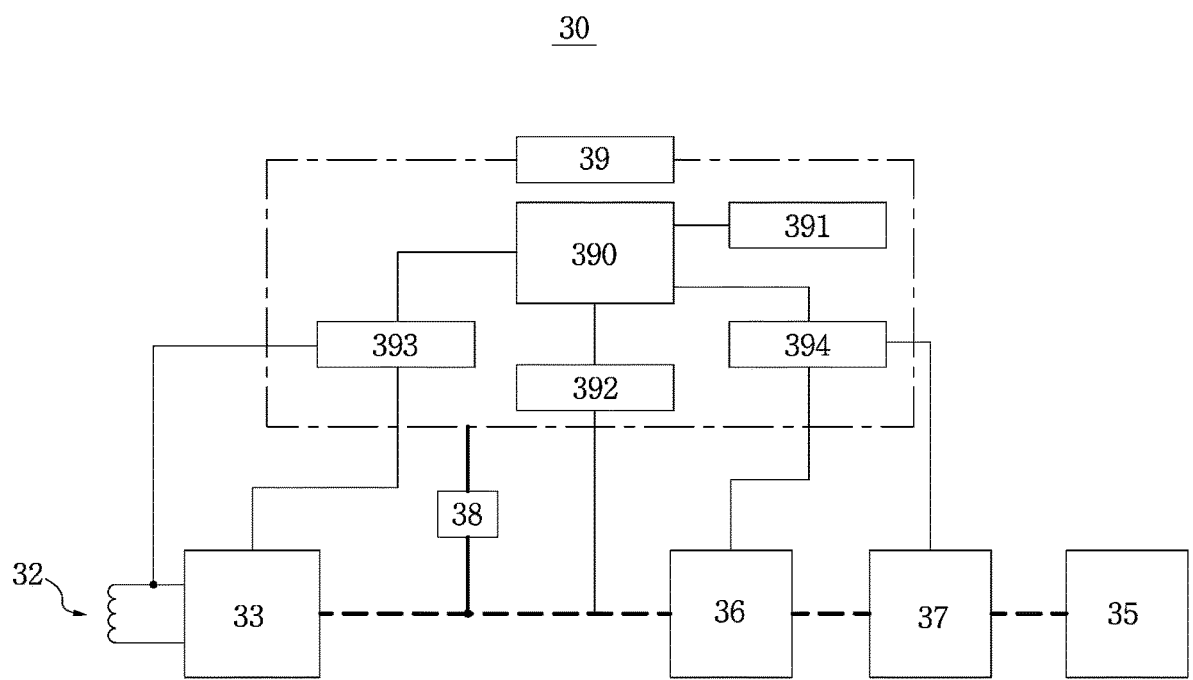
FIG. 3 is a block diagram of a wireless power receiving apparatus according to the present invention.
Figure 4:
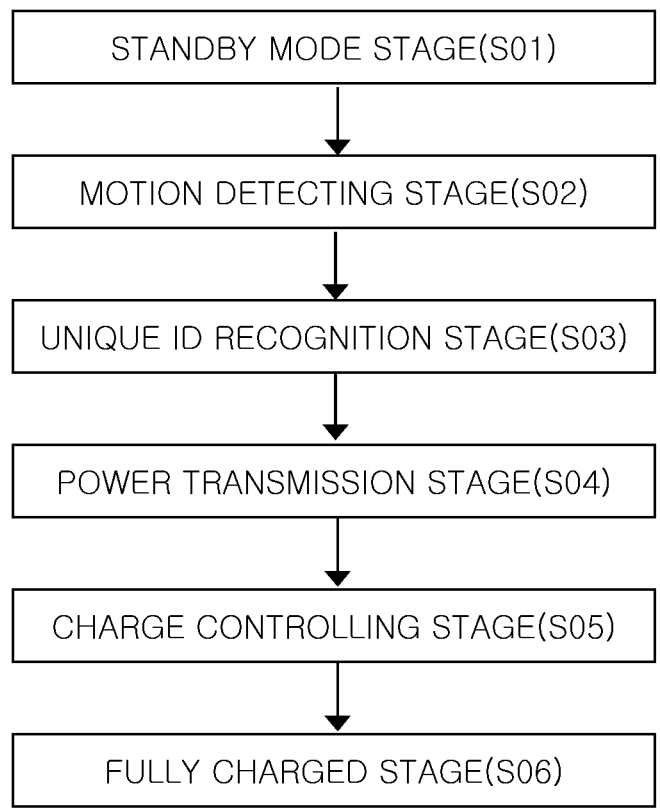
FIG. 4 is a flow diagram of a conceptual transmission control process for the wireless power charging system in accordance with the present invention.

FIG. 1 is a schematic configuration view of a wireless power charging system in accordance with the present invention, FIG. 2 is a block diagram of a wireless power transmission apparatus in accordance with the present invention, FIG. 3 is a block diagram of a wireless power receiving apparatus according to the present invention, and FIG. 4 is a flow diagram of a conceptual transmission control process for the wireless power charging system in accordance with the present invention.

Referring to FIGS. 1 to 4, a wireless power charging system A is formed with a wireless power transmission apparatus 10 to transmit the power signal for charging one or a plurality of wireless power receiving apparatuses 30 located in a short distance from the wireless power transmission apparatus 10.

The wireless power transmission apparatus 10 includes a power transmission apparatus case 11 as an outside body, housing therein a main control unit 21 and a resonant converter unit 23, which transmit an electric signal to the wireless power receiving apparatus 30 via a primary charge core 13; an output signal conversion module 22 for transmitting a converted electric signal to the resonant converter unit 23 by a control signal from the main control unit 21; and a received signal process module 24, which processes a signal transmitted from the wireless power receiving apparatus 30 via the primary charge core 13 and sends the processed signal out to the main control unit 21.

The resonant converter unit 23 includes an R-L-C series-parallel resonant converter. As shown in FIG. 1, the magnetic field is generated according to the electromagnetic core 13. With this process, the power signal is ready to be sent to the wireless power receiving apparatuses 30 located in a short distance from the wireless power transmission apparatus 10.

The power transmission apparatus case 11 (of the power transmission apparatus 10) includes a power on/off switch on the front side thereof; an input panel for signal input; and a display panel 14 showing the charging status of the wireless power receiving apparatus 30 and normal/abnormal status of the wireless power transmission apparatus 10. Inside the power transmission apparatus case 11, a power supply unit 25 is installed. Therefore, the operator can use the wireless power charging system A according to the displayed messages on the display panel 14 of the wireless power transmission apparatus 10.

The main control unit 21 of the wireless power transmission apparatus 10 may include a power supply block 211 coupled with the power supply unit 25 for the power supply to the wireless power transmission apparatus 10; a signal output block 212 for sending the signal to show the status on a display panel 14; a gate output signal process block 213 coupled with a output signal conversion module 22 for transmitting the transferred power 5 signal from the primary charge core 13; a received signal process block 214 for processing the transmitted signals from a received signal process module 24 which processes the transmission signal from the wireless power receiving apparatus 30; and a main controller 210 which controls the power supply block 211, the signal output block 212, the gate output signal process block 213, and the received signal process block 214.

Furthermore, the wireless power receiving apparatus 30 may include a secondary charge core 32 fronting the primary charge core 13 of the wireless power transmission apparatus 10 in order to receive the power signal via the resonant with the magnetic field; a received power signal conversion module 33 connected with the secondary charge core 32 for converting the received power signal; a charge circuit block 36 linked with the received power signal conversion module 33 in order to charge the battery cell 35; a protection circuit block 37 formed between the charge circuit block 36 and the battery cell 35 for detecting the charged current into the battery cell 35 and sending the charging status of the battery cell 35 to the wireless device control module 39; a voltage regulator block 38 for the power supply to the wireless device control module 39; and a wireless device control module 39 which controls the received power signal conversion module 33, the charge circuit block 36, the protection circuit block 37, and the voltage regulator block 38.

The wireless power receiving apparatus 30 can be included inside the portable electronic devices, for example, cellular phones, PDAs, PMPs, DMB terminals, MP3s or notebook computers.

With the wireless power charging system A, the power signal can be transmitted to the secondary charge core 32 of the wireless power receiving apparatus 30 by the resonance signals according to the electric field and magnetic field transferred from the primary charge core 13 although the wireless power receiving apparatus 30 is several meters apart from the wireless power transmission apparatus 10.

The secondary charge core 32 of the wireless power receiving apparatus 30 collects the power signals, which are the resonant signals by the electric field and magnetic field, and can be made of the materials like titanium dioxide (TiO2, dielectric constant 96), barium tetratitanate (BaTi409, dielectric constant 37), and lithium tantalite (LiTaO3, dielectric constant 40).

For the secondary charge core 32 corresponding to a power receiving antenna for the resonant signals, it is better to use the materials with the small loss according to the dielectric constant.

The wireless power charging system A with above-mentioned figures in accordance with the present invention is to transmit the power signal, as the resonant signal by the electric field and the magnetic field, to one or a plurality of wireless power receiving apparatuses 30. It is an advantage that the charging operation is still possible despite the increased or decreased numbers of the wireless power receiving apparatuses 30, even though the wireless power transmission apparatus 30 is sending out the same amount of the resonant signals.

If there is no wireless power receiving apparatus 30 in the near area; the power receiving apparatus 30 is placed in close proximity and starts being charged for the first time; or a changed condition happens like one or a plurality of wireless power receiving apparatuses 30 are fully charged and charging is stopped, the wireless power charging system A needs to be designed to transfer these information to the wireless power transmission apparatus 10 which operates properly in accordance with the received information.

As shown in FIG. 4, the wireless power charging system A will be changed to a standby mode stage S01, in which the charging operation will be stopped if there is no wireless power receiving apparatuses 30 near the wireless power transmission apparatus 10. At the standby mode stage S01, this system is regularly sending out the pulse signal by the predetermined cycle and detects if any wireless power receiving apparatuses 30 are approaching within several meters. When any approaching wireless power receiving apparatuses 30 are detected within several meters, the system will start sending out the charging power.

Before sending out the charging power, the system will perform a motion detecting stage S02 at first to check if the approaching objects are properly working wireless power receiving apparatuses 30.

In the standby mode stage S01, together with the pulse signal, the system will send out the signal asking for the unique ID data signal of the wireless power receiving apparatus 30. Next step is to perform a unique ID recognition stage S03 to recognize if the wireless power receiving apparatus 30 is the proper one for the charging operation with the received signal from the wireless power receiving apparatus 30.

When it is recognized as a properly working wireless power receiving apparatus 30 with a properly recognized unique ID, the system will start working the charging operation in a power transmission stage S04.

During the power transmission stage S04, the system can send out a unique code as an initial signal. This unique code is to recognize the status of the charged power and the condition of the equipment for every wireless power receiving apparatus 30 when a plurality of wireless power receiving apparatuses 30 are connected and being charged with the wireless power charging system A at the same time. The data value of the unique ID for each wireless power receiving apparatus 30 can be changed to a code value and this code value can be used for sending/receiving data for the unique ID of the wireless power receiving apparatus 30 instead.

When a plurality of wireless power receiving apparatuses 30 are connected and being charged at the same time, the system can be adapted to send out each status of the charged power and the condition of the equipment for every wireless power receiving apparatus 30 and control the charging amount at each charging stage in a charge controlling stage S05.

When a wireless power receiving apparatus 30 is fully charged according to the status of the charged power, the charging operation is controlled to stop working although the specific power signal for the wireless power receiving apparatus 30 is received.

When all the wireless power receiving apparatuses 30 are fully charged, a fully charged stage S06 will be performed to stop working the wireless power transmission apparatus 10.

Hence, the wireless power charging system A stops working the charging operation. The system is changed to the standby mode stage S01 and the wireless power transmission apparatus 10 is continuously sending out the pulse signal to detect another wireless power receiving apparatus 30 to be charged.

While the present invention has been shown and described in connection with the preferred embodiments, it will be apparent to those skilled in the art that modifications and variations can be made without departing from the spirit and scope of the invention as defined by the appended claims.

What is claimed is:

1. A wireless charging apparatus, comprising:
a converter unit to convert a power signal to a resonant power signal and to transmit the resonant power signal to a plurality of power receiving devices via a transmitting core; and
a controller configured to:
provide a different code to each of the power receiving devices, wherein each different code indicates a different device identification of each of the power receiving devices for communication between the wireless charging apparatus and each of the power receiving devices;
communicate with each of the power receiving devices to receive charge status information from each of the power receiving devices using the different code; and
control the converter unit to transmit the resonant power signal based on the charge status information.

2. The wireless charging apparatus of claim 1, wherein during a standby mode, the controller controls the converter unit to transmit a signal at a predetermined period to detect presence of an object.

3. The wireless charging apparatus of claim 1, wherein the different code is to be sent to each of the power receiving devices via the transmitting core.

4. The wireless charging apparatus of claim 1, wherein the controller is configured to determine that each the power receiving devices is capable of receiving power wirelessly based on information received from each of the power receiving devices.

5. The wireless charging apparatus of claim 1, wherein the controller is configured to control the converter unit to stop transmitting the resonant power signal and return to standby mode if none of the power receiving devices are available for charging.

6. The wireless charging apparatus of claim 1, wherein the controller is configured to control the converter unit to stop transmitting the resonant power signal and operate in standby mode if none of the power receiving devices are available for charging.

7. The wireless charging apparatus of claim 1, wherein the controller is configured to receive a unique identifier from each the power receiving devices, wherein the unique identifier is used to identify each the power receiving devices as capable of receiving wireless power.

8. The wireless charging apparatus of claim 7, wherein the different code is generated by modifying the unique identifier.

9. The wireless charging apparatus of claim 7, wherein the controller is configured to determine whether each of the power receiving devices is available for charging based on the charge status information received from each of the power receiving devices.

10. A method of operating a wireless charging apparatus, comprising:
providing identification codes to a plurality of power receiving devices, wherein each identification code indicates a device identification of each of the power receiving devices for communication between the wireless charging apparatus and each of the power receiving devices;
communicating with each of the power receiving devices to receive charge status information from each of the power receiving devices using the identification code; and
converting a power signal to a resonant power signal and transmitting the resonant power signal to the plurality of power receiving devices via a transmitting core based on the charge status information.

11. The method of claim 10, comprising transmitting a signal at a predetermined period during a standby mode to detect presence of an object.

12. The method of claim 10, comprising sending the identification code to each of the power receiving devices via the transmitting core.

13. The method of claim 10, comprising determining that each the power receiving devices is capable of receiving power wirelessly based on information received from each of the power receiving devices.

14. The method of claim 10, comprising stopping transmission of the resonant power signal and returning to standby mode if none of the power receiving devices are available for charging.

15. The method of claim 10, comprising stopping transmission of the resonant power signal and operating in standby mode if none of the power receiving devices are available for charging.

16. The method of claim 10, comprising receiving a unique identifier from each the power receiving devices, wherein the unique identifier is used to identify each the power receiving devices as capable of receiving wireless power.

17. The method of claim 16, comprising generating the identification code by modifying the unique identifier.

18. The method of claim 16, comprising determining whether each of the power receiving devices is available for charging based on the charge status information received from each of the power receiving devices.

19. A non-transitory computer-readable medium comprising instructions that, when executed by a processor, direct the processor to:
provide codes to a plurality of power receiving devices, wherein each code indicates a different device identification of each of the power receiving devices for communication with each of the power receiving devices;
communicate with each of the power receiving devices to receive charge status information from each of the power receiving devices using the code; and
control a converter unit to convert a power signal to a resonant power signal and transmit the resonant power signal to the plurality of power receiving devices via a transmitting core based on the charge status information.

20. The computer-readable medium of claim 19, comprising instructions to control a converter unit to transmit a signal at a predetermined period to detect presence of an object during a standby mode.

21. The computer-readable medium of claim 19, wherein the code is to be sent to each of the power receiving devices via the transmitting core.

22. The computer-readable medium of claim 19, comprising instructions to determine that each the power receiving devices is capable of receiving power wirelessly based on information received from each of the power receiving devices.

23. The computer-readable medium of claim 19, comprising instructions to control the converter unit to stop transmitting the resonant power signal and return to standby mode if none of the power receiving devices are available for charging.

24. The computer-readable medium of claim 19, comprising instructions to control the converter unit to stop transmitting the resonant power signal and operate in standby mode if none of the power receiving devices are available for charging.

25. The computer-readable medium of claim 19, comprising instructions to receive a unique identifier from each the power receiving devices, wherein the unique identifier is used to identify each the power receiving devices as capable of receiving wireless power.

26. The computer-readable medium of claim 25, wherein the code is generated by modifying the unique identifier.

27. The computer-readable medium of claim 25, comprising instructions to determine whether each of the power receiving devices is available for charging based on the charge status information received from each of the power receiving devices.

28. A wireless charging system, comprising:
a plurality of power receiving devices; and
a wireless charging apparatus to charge the plurality of power receiving devices using a resonant power signal, wherein the wireless charging apparatus comprises:
a converter unit to convert a power signal to the resonant power signal and to transmit the resonant power signal to the plurality of power receiving devices via a transmitting core; and
a controller configured to:
provide a different code to each of the power receiving devices, wherein each different code indicates a different device identification of each of the power receiving devices for communication between the wireless charging apparatus and each of the power receiving devices;
communicate with each of the power receiving devices to receive charge status information from each of the power receiving devices using the different code; and
control the converter unit to transmit the resonant power signal based on the charge status information.

29. The wireless charging system of claim 28, wherein during a standby mode, the controller controls the converter unit to transmit a signal at a predetermined period to detect presence of an object.

30. The wireless charging system of claim 28, wherein the different code is to be sent to each of the power receiving devices via the transmitting core.

31. The wireless charging system of claim 28, wherein the controller is configured to determine that each the power receiving devices is capable of receiving power wirelessly based on information received from each of the power receiving devices.

32. The wireless charging system of claim 28, wherein the controller is configured to control the converter unit to stop transmitting the resonant power signal and return to standby mode if none of the power receiving devices are available for charging.

33. The wireless charging system of claim 28, wherein the controller is configured to control the converter unit to stop transmitting the resonant power signal and operate in standby mode if none of the power receiving devices are available for charging.

34. The wireless charging system of claim 28, wherein the controller is configured to receive a unique identifier from each the power receiving devices, wherein the unique identifier is used to identify each the power receiving devices as capable of receiving wireless power.

35. The wireless charging system of claim 34, wherein the different code is generated by modifying the unique identifier.

36. The wireless charging system of claim 34, wherein the controller is configured to determine whether each of the power receiving devices is available for charging based on the charge status information received from each of the power receiving devices.

37. A power transmission device, comprising:
a device case;
a converter unit housed within the device case and configured to convert a power signal to a resonant power signal and to transmit the resonant power signal to a plurality of power receiving devices via a transmitting core; and
a controller housed within the device case and configured to:
provide a different code to each of the power receiving devices, wherein each different code indicates a different device identification of each of the power receiving devices for communication between the power transmission device and each of the power receiving devices;
communicate with each of the power receiving devices to receive charge status information from each of the power receiving devices using the different code; and
control the converter unit to transmit the resonant power signal based on the charge status information.

38. The power transmission device of claim 37, wherein during a standby mode, the controller controls the converter unit to transmit a signal at a predetermined period to detect presence of an object.

39. The power transmission device of claim 37, wherein the different code is to be sent to each of the power receiving devices via the transmitting core.

40. The power transmission device of claim 37, wherein the controller is configured to determine that each the power receiving devices is capable of receiving power wirelessly based on information received from each of the power receiving devices.

41. The power transmission device of claim 37, wherein the controller is configured to control the converter unit to stop transmitting the resonant power signal and return to standby mode if none of the power receiving devices are available for charging.

42. The power transmission device of claim 37, wherein the controller is configured to control the converter unit to stop transmitting the resonant power signal and operate in standby mode if none of the power receiving devices are available for charging.

43. The power transmission device of claim 37, wherein the controller is configured to receive a unique identifier from each the power receiving devices, wherein the unique identifier is used to identify each the power receiving devices as capable of receiving wireless power.

44. The power transmission device of claim 43, wherein the different code is generated by modifying the unique identifier.

45. The power transmission device of claim 43, wherein the controller is configured to determine whether each of the power receiving devices is available for charging based on the charge status information received from each of the power receiving devices.

\* \* \* \* \*